United States Patent
Koonen (10) Patent No.: US 9,766,405 B2
(45) Date of Patent: Sep. 19, 2017

(54) SYSTEM AND METHOD FOR PHOTONIC DETECTION AND EXCITATION OF MULTIPLE FIBRE MODES

(71) Applicant: BEAM Photonic Technologies, Inc., The Woodlands, TX (US)

(72) Inventor: Antonius Marcellus Jozef (Ton) Koonen, Noord-Brabant (NL)

( * ) Notice: Subject to any disclaimer, the term of this patent is extended or adjusted under 35 U.S.C. 154(b) by 0 days.

(21) Appl. No.: 15/148,502

(22) Filed: May 6, 2016

(65) Prior Publication Data

US 2016/0306115 A1 Oct. 20, 2016

Related U.S. Application Data

(60) Provisional application No. 62/327,981, filed on Apr. 26, 2016, provisional application No. 62/327,977, filed on Apr. 26, 2016.

(30) Foreign Application Priority Data

| Apr. 19, 2015 | (AU) | ................................ | 2015901395 |
| May 29, 2015 | (AU) | ................................ | 2015901995 |

(51) Int. Cl.

| G02B 6/30 | (2006.01) |
| G02B 6/27 | (2006.01) |
| H04B 10/2581 | (2013.01) |
| G02B 6/124 | (2006.01) |
| G02B 6/34 | (2006.01) |
| G02B 6/14 | (2006.01) |
| G02B 6/122 | (2006.01) |
| G02B 6/28 | (2006.01) |

(52) U.S. Cl.
CPC ............ *G02B 6/30* (2013.01); *G02B 6/124* (2013.01); *G02B 6/14* (2013.01); *G02B 6/2773* (2013.01); *G02B 6/34* (2013.01); *H04B 10/2581* (2013.01); *G02B 6/1228* (2013.01); *G02B 6/2726* (2013.01); *G02B 6/2813* (2013.01)

(58) Field of Classification Search
None
See application file for complete search history.

(56) References Cited

U.S. PATENT DOCUMENTS

| 8,995,803 B2 | 3/2015 | Bickham et al. |
| 2013/0216194 A1 | 8/2013 | Sun |

FOREIGN PATENT DOCUMENTS

JP  2012-215696 A  11/2012

OTHER PUBLICATIONS

H. Chen et al. "Integrated Mode Group Division Multiplexer and Demultiplexer Based on 2-Dimensional Vertical Grating Couplers", ECOC 2012 Technical Digest, Th1B2, European Conference and Exhibition on Optical Communication 2012, Amsterdam Netherlands, Sep. 16-20, 2012.*
H. Chen. "Optical Devices and Subsystems for Few- and Multimode Fiber based Networks". Dissertation at Eindhoven University of Technology, 2014. Retrieved via https://pure.tue.nl/ws/files/3806896/773124.pdf. Excerpted pp. 31-32, 56-60, 116.*

* cited by examiner

*Primary Examiner* — Mike Stahl (57) ABSTRACT

A 2-dimensional grating generates multi-mode light from two or more single-mode inputs. One or more waveguides couple the light from the single-mode inputs to the 2-dimensional grating. The 2-dimensional grating couples and transmits the generated multi-mode light to an optical fiber configured to support multiple modes.

10 Claims, 8 Drawing Sheets

SYSTEM AND METHOD FOR PHOTONIC DETECTION AND EXCITATION OF MULTIPLE FIBRE MODES

REFERENCE TO RELATED APPLICATIONS

This application claims the benefit of U.S. Provisional Patent Application No. 62/327,981 filed Apr. 26, 2016, and also claims the benefit of U.S. Provisional Patent Application No. 62/327,977 filed Apr. 26, 2016, and also claims the benefit of Australian Provisional Application No. 2015901995 filed May 29, 2015, and also claims the benefit of Australian Provisional Application No. 2015901395 filed Apr. 19, 2015, all of which are herein incorporated by reference.

TECHNICAL FIELD

The subject application teaches embodiments that relate generally to mode division multiplexing over a fiber optic channel, and specifically to a circuit for emitting and detecting multiple modes simultaneously on multi-mode fiber.

SUMMARY

In an example embodiment, a method includes receiving light from two or more single-mode fiber inputs, coupling the received light to a 2-dimensional grating using one or more waveguides, and generating multi-mode light by the 2-dimensional grating. The multi-mode light is coupled and transmitted to an optical fiber that is configured to support multi-mode light.

In an example embodiment, a system includes first and second single-mode fiber inputs, and one or more waveguides to couple light from the single-mode fiber inputs to a 2-dimensional grating. The 2-dimensional grating is configured to generate multi-mode light from the received single-mode light and couple the generated multi-mode light to an optical fiber configured to support multiple modes.

BACKGROUND

Rapid growth in various forms of communications through all available data transmission networks using current single-mode fibre over the next decade is expected to exceed the data transport capacity of optical fibre links which currently utilize time, frequency and optical wavelength domain multiplexing techniques.

BRIEF DESCRIPTION OF THE DRAWINGS

FIG. 7bis is a diagram of a system for generating a bipolar $LP_{11}$ mode field from a unipolar $LP_{01}$ mode field according to an embodiment of the disclosure.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
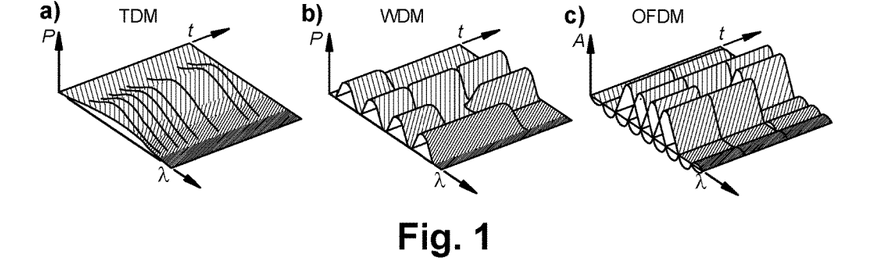
FIG. 1 is a diagram of a comparison of OFDM, WDM & TDM waves.

Single-mode fibre is the most used optical fibre type in today's data transmission and communications systems. Single-mode fibre is used beyond its so-called cut-off wavelength, where it guides only one mode, the $LP_{01}$ mode. This single mode may be used in two orthogonal (i.e., at a 90° angle) polarization states, thereby providing two independent channels. This process is referred to as polarization multiplexing (PolMUX). (See FIG. 1).

The systems and methods disclosed herein extend this capacity using a new methodology for multiplexing. Such a methodology is created by the existence of multiple modes that are guided in an optical fibre when it is used below its cut-off wavelength. The disclosed system and method offers a stable and compact solution for exciting and detecting individual light mode fields in multi-mode fibre field environment.

Figure 5:
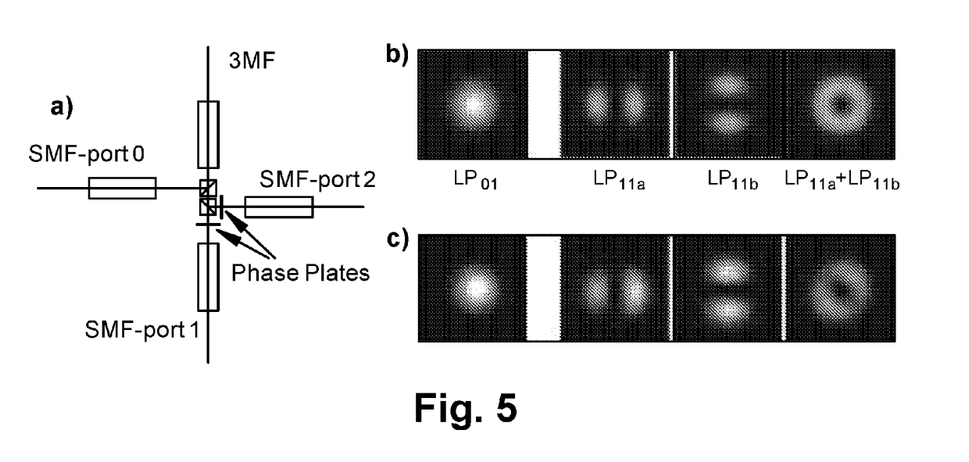
FIG. 5 is a diagram of mode multiplexing utilizing a bulk optics device according to an embodiment of the disclosure.
Figure 6:
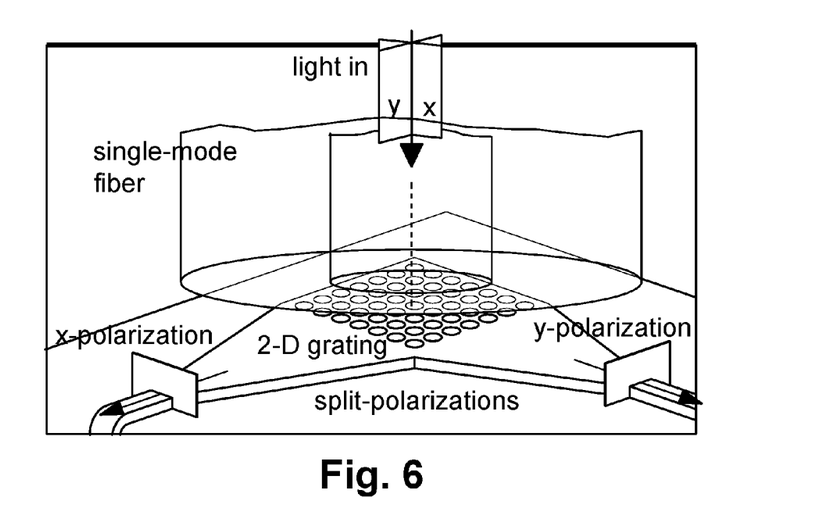
FIG. 6 is a diagram of a polarization splitter utilizing a light-splitting grating coupler according to an embodiment of the disclosure.

Solutions for exciting and detecting individual mode fields in a fibre can use bulk optics (See FIG. 5), which are complex to fabricate and generally unstable.

Time-division multiplexing (TDM), or optical time-division multiplexing (OTDM), are methods of transmitting and receiving independent signals over a common signal path by means of synchronized switches at each end of the transmission line so that each signal appears on the line only a fraction of time later in an alternating pattern. (See FIG. 1)

Wavelength division multiplexing (WDM) is a technique where optical signals with different wavelengths are combined, transmitted together, and separated again. No time synchronization among these signals is needed. It is primarily used to transmit data separately in several channels with slightly different wavelengths. It may also be used to submit a signal in parts in many channels simultaneously, with due synchronization among these signal parts.

Systems and methods of the present disclosure enable one to excite multiple light modes (i.e., light beams) in the fibre at the transmitting end, and to separate them at the receiving end.

Figure 2:
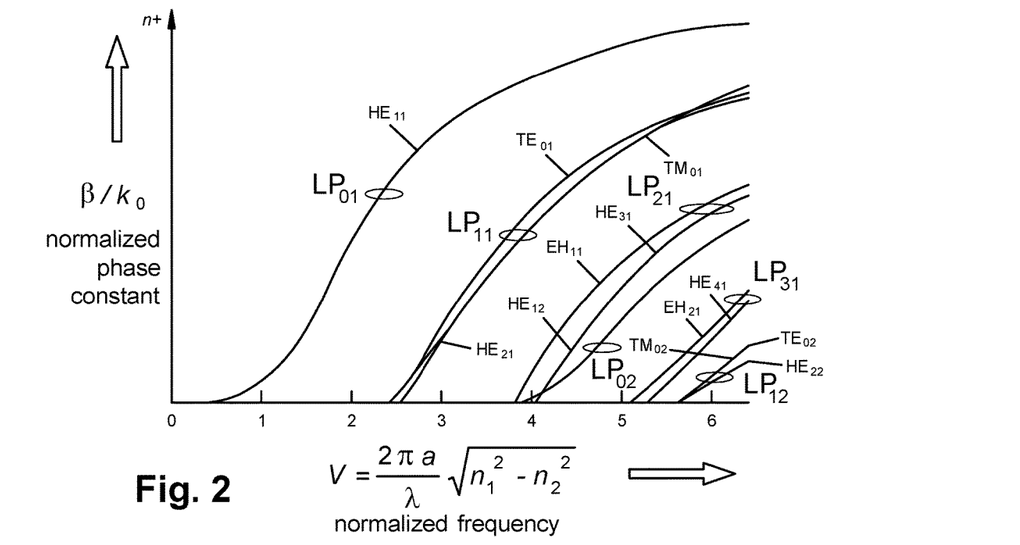
FIG. 2 is a diagram of guided modes in a step-index optical fibre versus the normalized light frequency according to an embodiment of the disclosure.

Pursuant to Maxwell's field equations, fibre typically guides light in various mode field patterns (See FIG. 2). For a weakly guiding fibre, the mode solutions which follow from solving the relevant Maxwell's field equation, where $n_1/n_2 \cong 1$, may be grouped in linearly polarized (LP) modes.

The fundamental mode (HE") equals the $LP_{01}$ mode, and has no cut-off. Stated another way, light is guided for every normalized frequency V, and thus for every wavelength $\lambda$. When increasing V beyond 2.405, which is equivalent with lowering the wavelength below the cut-off wavelength corresponding with V=2.405, the fibre will guide multiple modes; when increasing V, these additional modes will subsequently be the $LP_{11}$ mode, $LP_{21}$ mode, $LP_{02}$ mode, $LP_{31}$ mode, $LP_{12}$ mode, etc.

In an embodiment, a miniaturized integrated circuit significantly increases the speed of data transmission in fiber optic systems. It is particularly applicable to overcoming the limitations of fiber optic digital communication systems which utilize a single transmission mode optical fiber. Historical systems rely on time (or frequency) division multiplexing, wavelength division multiplexing, or a combination of both, to increase data transmission capacity. (See FIG. 2)

The present disclosure is applicable to high data rate transmission, such as the transmission of conventional or high definition video, but is equally applicable to transmission of any form of digital information, including but not limited to, real time sharing of medical & scientific research; defense response systems; corporate data sharing; security monitoring; real time sharing of educational libraries; personal medical information & condition tracking & integration; home & commercial robotic control systems to assist the elderly or infirmed stay in their homes; 3-D (i.e., holographic) telecommunications; field to fridge produce/consumables tracking & automated reordering; machine-to-machine communications systems; home & office ambience video walls (i.e., video walls that real-time broadcast a live scene from another place in the world); enhanced internet search results; and the spectrum of commercial and non-commercial internet based enterprises that exist currently and will be created in the future.

Through mode division multiplexing (MDM), different spatial modes in a multi-mode fiber can serve as discrete communication channels. This possibility has not been exploited in practice yet. Current systems typically rely on single mode fiber.

Mode division multiplexing requires technology for combining several data streams into different modes of a multi-mode fiber (i.e., multiplexing), and for receiving a signal from a multi-mode fiber and separating out individual mode signals (i.e., de-multiplexing).

The MDM function using a bulk optics approach (See FIG. 5) is costly and has difficulty providing the required performance in a stable way. Therefore, such MDM technology has not to date been commercially deployed.

In an embodiment of the disclosure, an optical integrated circuit (IC) provides MDM multiplexers and de-multiplexers. These optical ICs are reciprocal devices, so the same device can be made to function as both multiplexer and de-multiplexer, depending on how it is configured.

Optical ICs according to the present approach guide several on-chip optical signals in distinct single mode waveguides. These waveguides feed the signals to two-dimensional (2-D) grating couplers which are placed so that light is radiated from the waveguides and emitted in two distinct polarization states from the surface of the optical IC.

Figure 4:
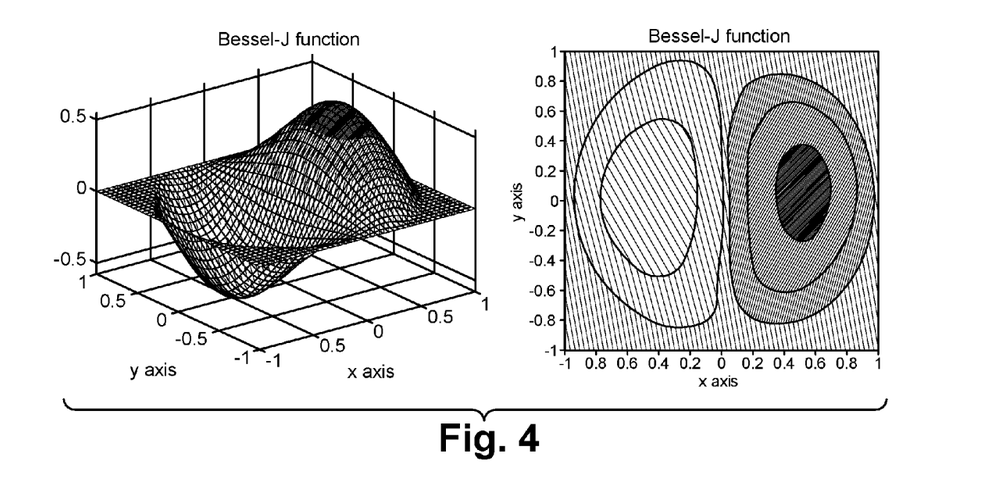
FIG. 4 is a diagram of electrical field $E_Z$ of the $LP_{11A}$ mode, and where the field of the $LP_{11B}$ mode is rotated by $\pi/2$ according to an embodiment of the disclosure.
Figure 7:
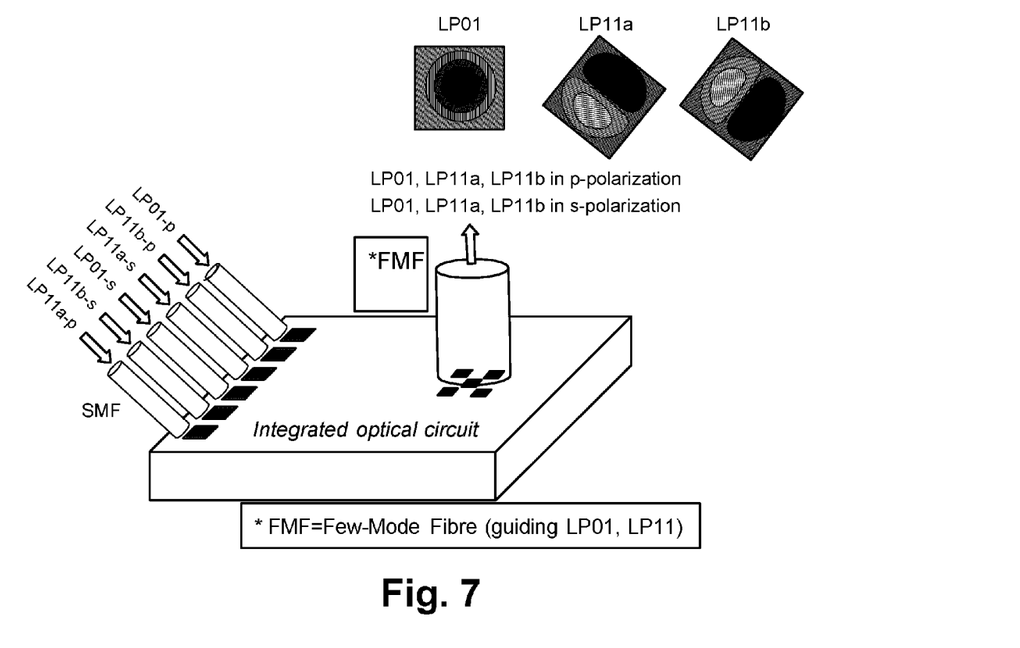
FIG. 7 is a diagram of a multi-channel integrated optical circuit device which multiplexing light in to several modes according to an embodiment of the disclosure.

When V>2.405, the $LP_{11}$ mode (comprised of $TE_{01}$, $HE_{21}$ and $TM_{01}$ modes) light can likewise be guided in the fibre. When the wavelength of light is further lowered, V likewise increases, resulting in more and more modes being guided. The integrated mode multiplexer circuit according to the disclosure (See FIG. 7) has multiple single-mode input fibres, of which the $LP_{01}$ fields are transformed by the circuit respectively into $LP_{01}$, $LP_{11A}$ and $LP_{11B}$ modes. These modes are subsequently multiplexed and launched into the output multimode fibre. The $LP_{11}$ mode has a bipolar electrical field, as shown in FIG. 4. The transformation of the input unipolar $LP_{01}$ mode into a bipolar $LP_{11}$ mode is according the disclosure done by the converter circuit shown in FIG. 7.bis.

The launching into the multi-mode fiber can be accomplished by vertically emitting 2D grating couplers. The 2-D grating couplers are arranged on the IC surface and coupled to the waveguides so that each waveguide signal creates a pattern of emitted radiation (i.e., light) from the grating couplers that is an approximate match to the multi-mode fibre, in amplitude, phase and/or polarization. Each waveguide is thus associated with a distinct mode of the fiber, thereby providing the multiplexing function.

This same structure can provide de-multiplexing, with input radiation (i.e., light beam) from the multi-mode fiber being received by the 2-D grating couplers and eventually divided among the on-chip single mode waveguides such that each waveguide signal is associated with a corresponding mode signal on the multi-mode fiber.

Although not an exhaustive list, 'Alternative Embodiments' describes examples of this approach, where the multi-mode fiber has 3 spatial modes ($LP_{01}$, $LP_{11A}$, $LP_{11B}$) with 2 polarization states each in order to provide a total of 6 independent channels in the current embodiment. The two inputs of the 2D grating coupler each launch a polarization state.

In an embodiment, a multi-mode fiber with several independent channels (i.e., cores) can be used.

After the $LP_{01}$ has been created, the first modes to be guided are the $LP_{11}$ modes, which have a distinctly different mode field pattern from the $LP_{01}$ mode. The $LP_{11}$ mode comes in two orthogonal (i.e., rotated at 90°) field patterns, named $LP_{11a}$ and $LP_{11b}$, and each of these modes can again support two orthogonal (i.e., rotated at 90°) polarization states, which thus creates four independent channels.

When the applied wavelength of the $LP_{11}$ mode is below the cut-off wavelength, but above the cut-off wavelength of the next-higher mode (i.e., $LP_{21}$), one can create six (6) independent channels on the fibre (2× $LP_{01}$, and 4× $LP_{11}$).

Each mode can constitute a transmission path in the fibre which is independent from the other paths; this "mode division multiplexing" can multiply the transport capacity of the fibre. In addition to mode division multiplexing (MDM), one can use multiple wavelengths within each mode (WDM), and within each wavelength, one can use time division multiplexing (TDM).

Thus MDM creates a transmission rate compounding effect that can be seen as opening an extra dimension in fibre optic communication, and promises to be an attractive route for increasing fibre capacity in response to the booming capacity needs of a rapidly expanding Internet.

The excitation and detection of 6 mode field channels can be accomplished using a device constructed with bulk optics (i.e. with lenses and phase plates). Such devices are mechanically elaborate, and require special measures to assure stability. Moreover, the launching with phase plates exploits only the phase domain for excitation of the modes, and not the amplitude domain.

The present system and method provides a low cost miniaturized integrated optical circuit for exciting six (6) mode field patterns. It connects 6 individual input fibres, thereby providing individual channel data signals to the common output fibre (i.e., Few-Mode Fibre). The disclosure carries 6 mode field channels (See FIG. 7).

The multi-channel miniaturized integrated optical circuit is reciprocal, so it can also be used as a mode de-multiplexer. It can be reversed to separate the 6 mode field channels arriving via the common fibre into 6 individual output fibres. (See FIG. 8).

The miniaturized integrated circuit is based on planar integrated optical waveguide technology, and can be fabricated using Iridium-Phosphide integrated optical circuit processes, or silicon photonic integrated optical circuit processes.

At the left side of the circuit, the input signals to be multiplexed are fed by standard single-mode fibres (SMF) and coupled into the waveguides on the chip by means of grating couplers. Optimum coupling takes place when the SMF launches the grating coupler at a specific angle, according to grating coupler principles, known to those familiar with the art.

Five (5) two-dimensional (2-D) grating couplers, situated on the right of the circuit, launch into the Few-Mode Fibre (FMF), positioned vertically above these couplers. Each coupler can handle two orthogonal polarizations, each launched via an input port of the coupler.

Such 2D grating couplers are feasible because they are able to launch or receive light vertically from a fibre as has been previously reported. In order to match the field distribution of the $LP_{01}$ mode in the FMF (See FIG. 3), the signals launched into the two orthogonal polarization states of this mode are fed to the central 2D grating coupler.

Figure 3:
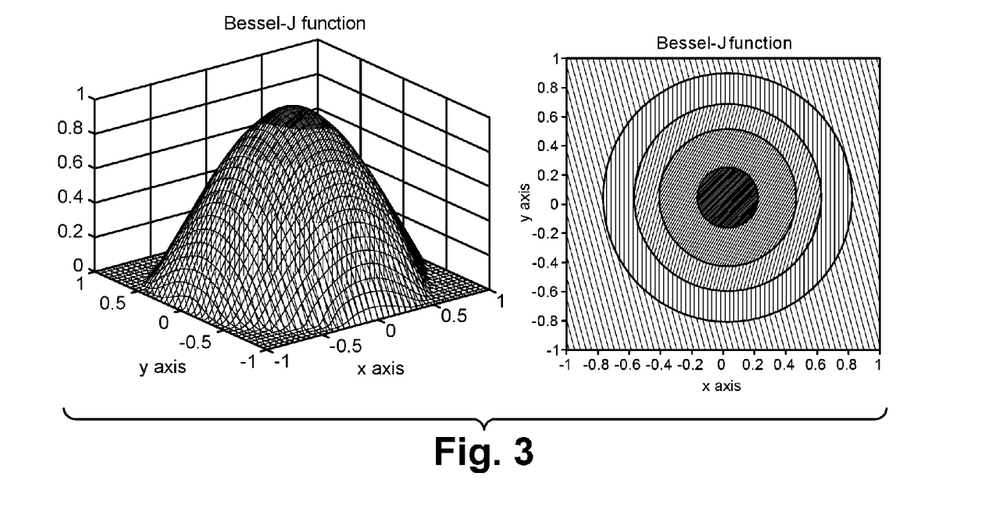
FIG. 3 is a diagram of the electrical field $E_Z$ of the $LP_{01}$ mode according to an embodiment of the disclosure.

To launch the $LP_{11a}$ mode in the FMF, two 2D grating couplers located at diagonally opposite positions are used, from where the emerging optical fields need to differ π in phase in order to optimally match the $LP_{11A}$ mode field distribution (See FIGS. 3 & 4).

The two signals needed for driving the two 2D grating couplers are derived from a single input by means of a 50%/50% field splitter (i.e., 1×2 multimode interference coupler), from which two waveguides feed them to the respective 2D grating coupler.

The required π phase difference is obtained by designing the waveguides so that their length is approximately equal, which mathematically means that one of the waveguides has additional curves, plus a phase tuning element which can tune the phase to assure the π phase difference; See FIG. 7.*bis*.

In one example, such phase tuning can be implemented by a heater element which can effect a slight local change in the refractive index of the waveguide.

Similarly as described above for the $LP_{01}$ mode, the two polarizations of the $LP_{11A}$ mode are launched by deploying both the x-polarization and y-polarization operation modes of the 2D grating couplers.

Similarly as for the $LP_{11A}$ mode, the two polarizations of the $LP_{11B}$ mode are launched via the two 2D grating couplers located at the diagonally opposite positions. The design considerations for the waveguides and the phase tuning elements are identical to those for the $LP_{11A}$ mode.

The disclosed miniaturized integrated optical circuit is compact and stable, hence resolving the mechanical issues and reducing cost. Moreover, it uses both the phase and the amplitude domain for selectively launching the modes, and yields higher performance in terms of launching efficiency, with better selectivity, better stability and less crosstalk between modes, when compared to the bulk optics approach (See FIG. 5).

Figure 8:
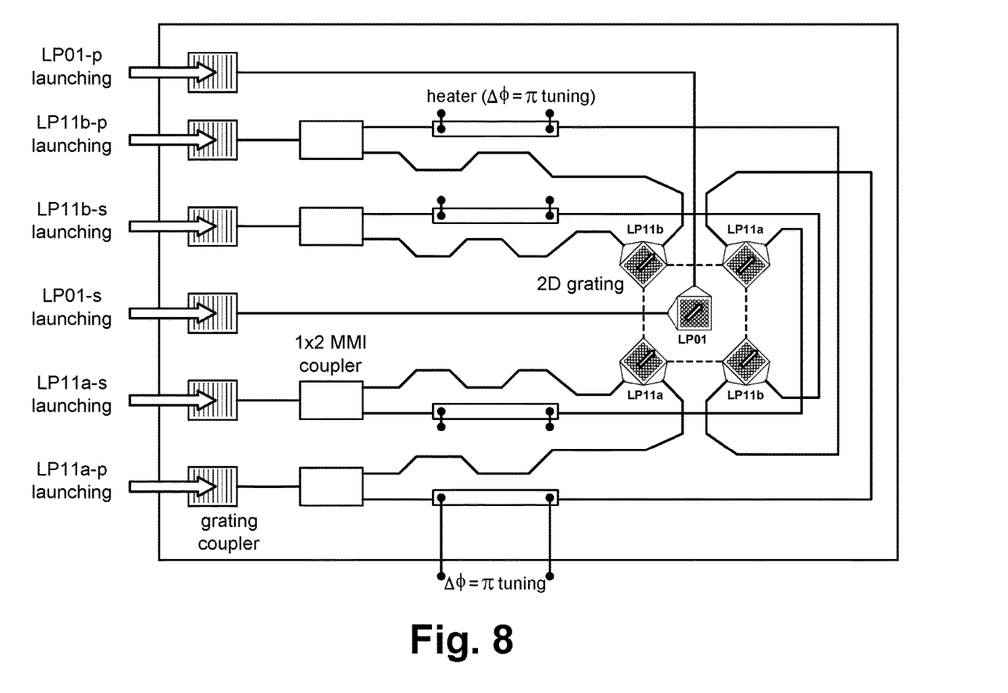
FIG. 8 is a diagram of an internal schematic of a first multi-channel integrated optical circuit for mode multiplexing according to an embodiment of the disclosure.

In another embodiment of the disclosure, four 2D grating couplers are used as shown in FIG. 8. It deploys push-pull driving of opposite 2D grating couplers to excite an $LP_{11}$ mode. It should be noted that the differential mode field pattern of an $LP_{11}$ mode can be demonstrated (See FIG. 3), and common mode driving of the same 2D grating couplers which thereby excite the $LP_{01}$ mode relying on the rotational symmetric mode field pattern of the $LP_{01}$ mode (See FIG. 2).

The push-pull impulse signals are obtained by using a π phase shifter in combination with the relevant 1×2 Multi-Mode Interference (MMI) power splitter/combiner (See FIG. 7.*bis* and FIG. 8).

It is also shown that the driving signals of the 2D grating couplers are formed out of the individual input signals launched into the photonic integrated circuit (See FIG. 8). The E-fields are illustrated with x1 and x2 for common-mode driving of the two $LP_{01}$ modes, and the E-fields indicated with y1 through y4 for push-pull driving the four $LP_{11}$ modes.

The advantages of this embodiment are that it allows longer tapered waveguide regions to feed the 2D grating couplers, and that the 2D grating couplers themselves can be slightly larger which improves the coupling into the $LP_{11}$ and $LP_{01}$ modes (See FIG. 7).

The disadvantage of this embodiment is that in order to assure the correct phase relations at the inputs of the 2D grating couplers, there is created a less efficient coupling into the $LP_{01}$ mode, and more complex on-chip waveguide structures because it requires phase tuning sections in each outlet of the 1×2 MMI couplers at the left side (See FIG. 8).

Figure 9:
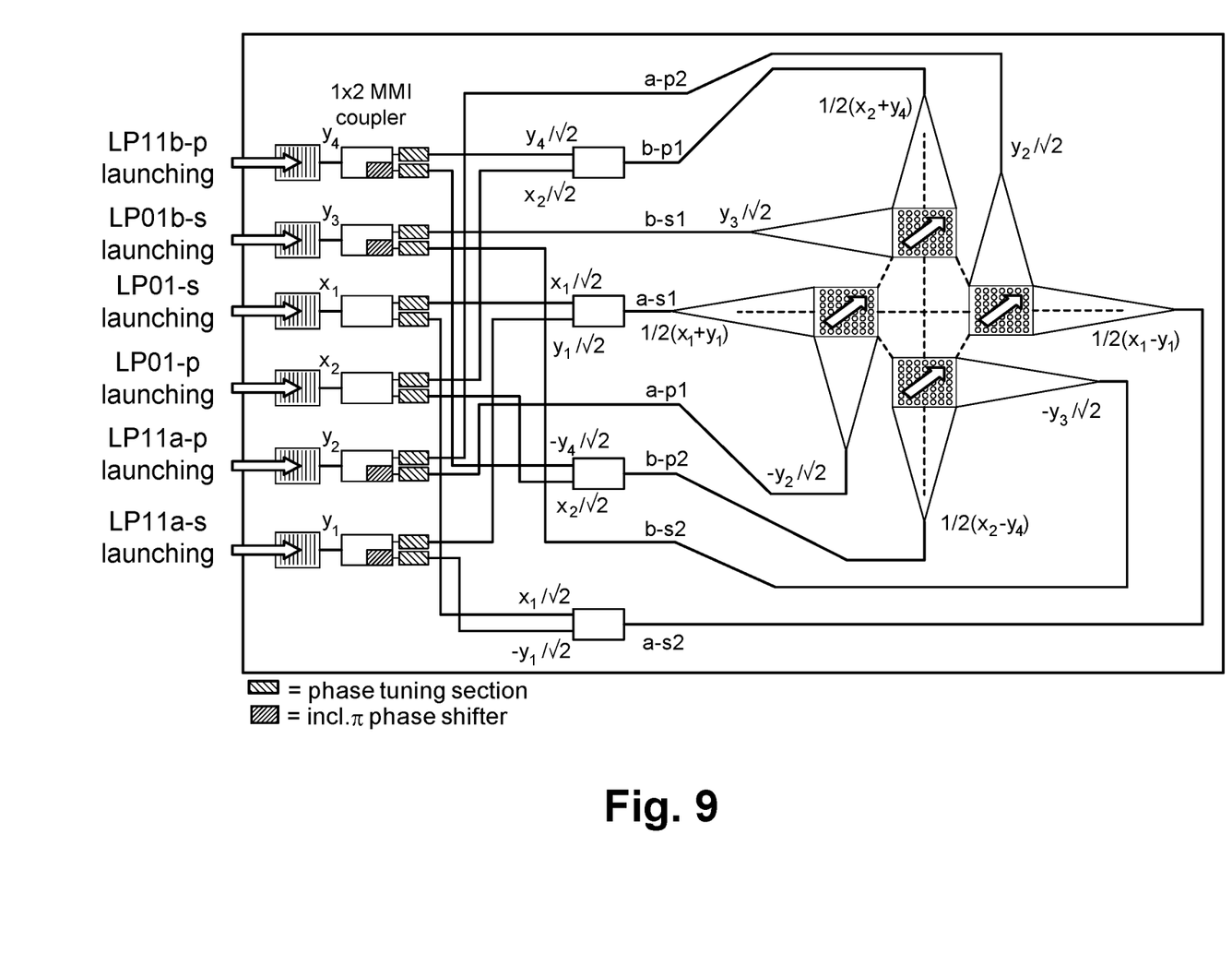
FIG. 9 is a diagram of a second multi-channel integrated optical circuit for mode multiplexing according to an embodiment of the disclosure.
Figure 10:
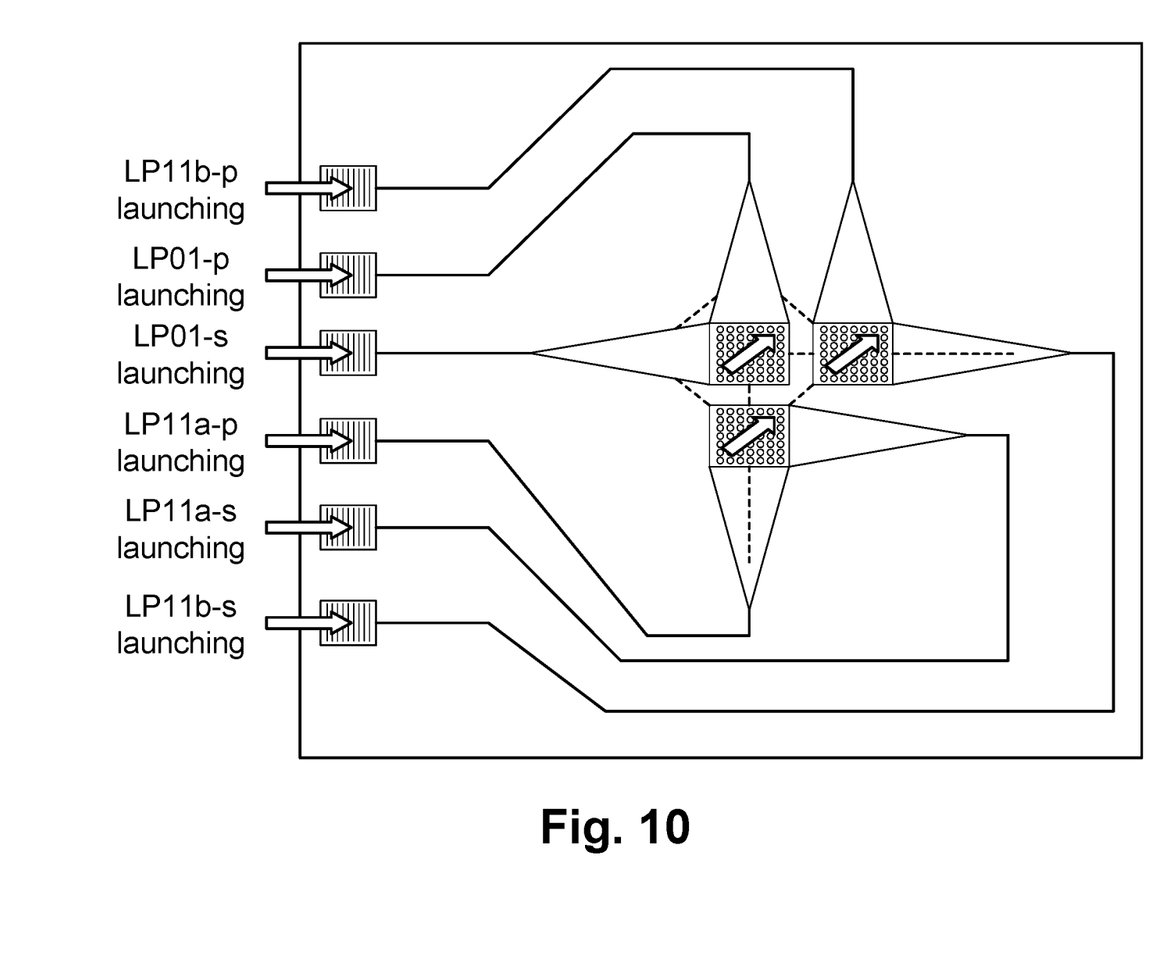
FIG. 10 is a diagram of a third multi-channel integrated optical circuit for mode multiplexing according to an embodiment of the disclosure.

In another embodiment of the disclosure three 2D grating couplers are used as shown in FIG. 9. It has a centrally positioned 2D grating coupler for driving the $LP_{01}$ mode, and two outer positioned 2D grating couplers to drive the $LP_{11A}$ and $LP_{11B}$ modes, respectively. The $LP_{11}$ modes are, however, not driven in push-pull mode, rather they are driven in an asymmetric (i.e., one sided) mode.

The advantages of this embodiment are a very simple integrated optical circuit structure, with only three 2D grating couplers; no need for phase-tuning sections; and, the allowance for long tapered waveguide regions to feed the 2D grating couplers.

The disadvantages are a less efficient coupling into the $LP_{11}$ modes, and potential significant crosstalk into the $LP_{01}$ mode when driving the $LP_{11}$ mode. However, crosstalk in this embodiment is not present when driving in push-pull mode (See FIG. 7 & FIG. 8). Elimination of possible crosstalk requires extra signal processing in the electrical domain, and will to a small degree decrease the performance of the system.

The combination of MCF and MMF is called Multi-Mode Multi-Core Fibres (MM-MCF) wherein multiple cores are incorporated within the same fibre cladding and each core allows multiple modes to be operated as separate channels in parallel. A well-known issue in multi-mode operation of a fibre transmission link is differential mode delay (DMD), referred to those versed in the art, as dispersion, or the dispersive effects which lead to propagation time differences among the multiple modes of light.

DMD can be explained because a plurality of fiber modes, as may be excited by the 3-D Mode Multiplexing Chip, typically have differing group velocities, as their phase characteristics are different. Typically, each of the multiple modes propagating through the fibre core is not excited with a single data channel, but with a linear combination of data channels. And the modes usually exchange power among each other during transmission, which is described by those with an understanding of the art as crosstalk. It is important for these delay differences among the modes to be resolved for the purposes of combatting crosstalk effectively and thus ensuring data integrity.

The present disclosure overcomes the limitations that are attendant upon the propagation of multiple modes of light. Disclosed is a multi-core fibre transmission link, where each core guides multiple modes generated, for example by a 3-D Mode Multiplexing Chip. The disclosed embodiments can reduce DMD and increase the transmission capacity within a single fibre having comparatively small outer cladding diameter.

DMD in any multimode fibre leads to crosstalk, which will be removed or reduced in order to avoid the need for significant signal processing at the receiver end of the data transmission stream. Typically each of the modes of a multimode fibre is not excited with a single data channel, rather it takes a linear combination of data channels to excite every mode. Usually multiple modes exchange power among each other during transmission thereby causing crosstalk.

The disclosed systems and methods, in various embodiments, use an arrangement of multiple cores of multi-mode multi-core fibre or a multi-mode single-core fibre, in order to increase the transmission capacity, and to take full advantage of the data generation and transmission capability of the 3-D Mode Multiplexing Chip.

After transmission through a fibre section with positive DMD, transmission through a section with negative DMD can result in an accumulated DMD that is very small. Thus by alternating fibre sections with positive DMD, and then with negative DMD, the overall resulting DMD of the whole link will be very small. This results in desired amount of reduction in multiple-input multiple-output signal processing complexity and hence system performance increases.

In order to achieve this result, a multi-core fibre is proposed with one core, preferably in the centre, and an even number of outer cores with half of the cores having a positive DMD and the other half having an equally large negative DMD. For example, see the multi-core fibre of co-pending U.S. application Ser. No. 15/148,542 filed May 6, 2016 and titled "SYSTEM AND METHOD FOR MULTI-MODE OPTICAL FIBER" that also claims the benefit of U.S. Provisional Patent Application No. 62/327,977, filed Apr. 26, 2016.

Figures 11, 12:
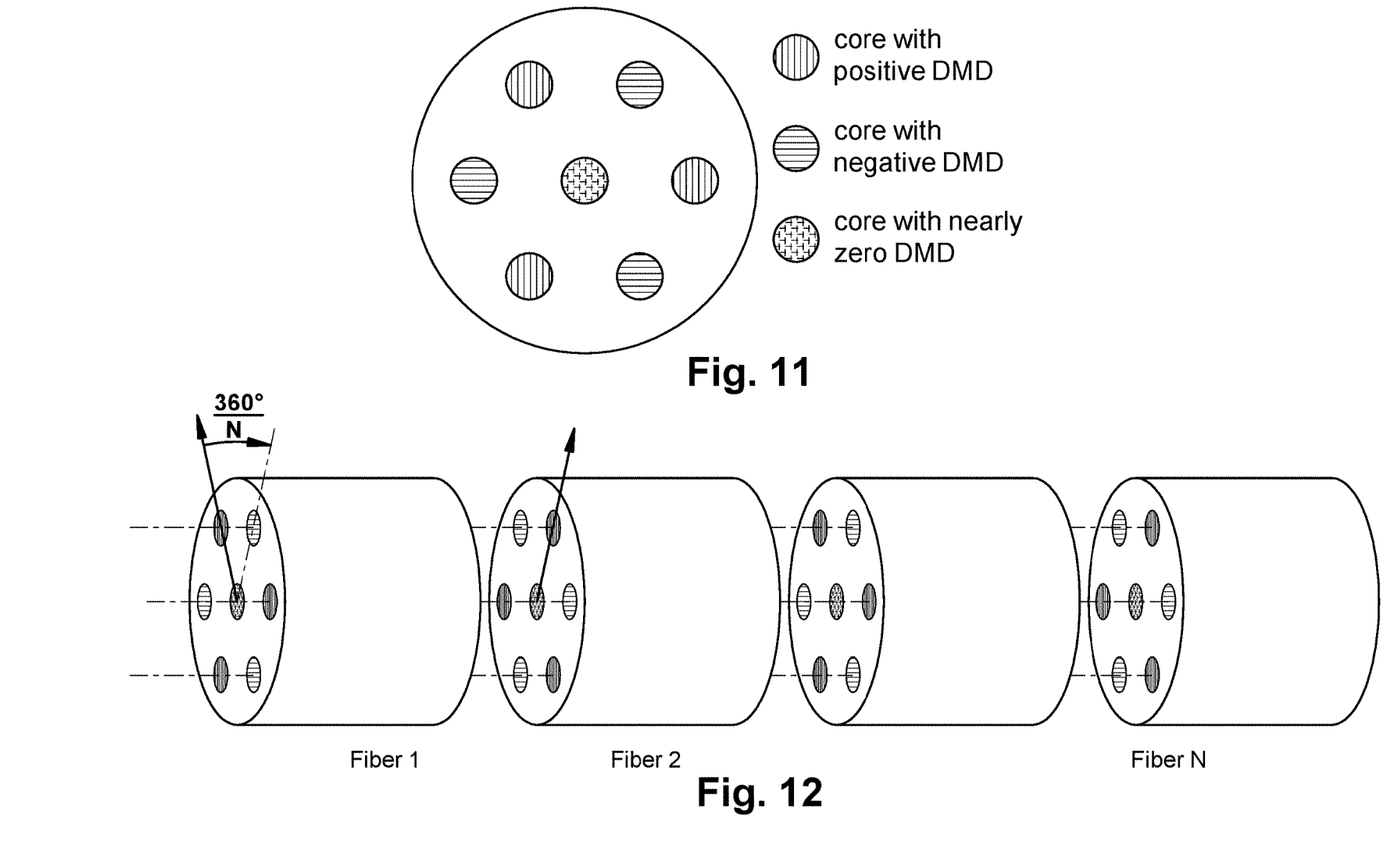
FIG. 11 is a diagram of multi core fibres with alternating differential mode delay values in the N outer cores according to an embodiment of the disclosure.
FIG. 12 is a diagram of differential mode delay compensation or mitigation by concatenating multi core fibres with N outer cores and alternating differential mode delay of successive cores, by rotating the joints over an angle of 360°/N according to an embodiment of the disclosure.

In accordance with this a multiple core fibre with 7 cores is shown in the FIG. 11. Number of outer cores, N=6, 3 cores out of 6 have positive DMD (cores with vertical lines) and the other 3 outer cores (cores with horizontal lines) have an equally-large negative DMD. The central core (core with hashes) may have a very small DMD (close to zero). It may be used for carrying lower-speed data streams, such as needed for management and control signals along the link.

The above mentioned design of multiple core fibre allows concatenation of MCF sections. By rotating the fibre joints with respect to each other by 360/N degrees, one section compensates the DMD of the previous one.

In the embodiment, positive DMD cores are connected to negative DMD ones and vice-versa. The overall end-to-end DMD of the whole concatenated fibre link can thus be very small, provided that the link installation is such that the MCF section lengths have approximately the same length. The procedure is explained with regard to FIG. 12.

In an embodiment, the concatenation of fibre sections with opposite DMD values may also be incorporated for a single-core fibre. In a single core fibre, both positive and negative DMD sections can be laid out to minimize the smear effects of two directional data transmission for more localized transmission of data.

In another embodiment, concatenation of fibre sections with opposite DMD values may also be incorporated for a two core fibre. In a two core fibre, both positive and negative DMD sections can be laid out to minimize the smear effects of two directional data transmission, such as may be needed in an office where both upload and download speeds are required to increase.

In accordance with embodiments of the present disclosure, a single optical fibre can be developed and manufactured with multiple multimode cores. These kinds of fibres are useful in the field of manufacturing efficiency and stock maintenance. The design of the manufactured fibre has cores laid out in a rotationally-symmetric topology with one core located in the center of the fibre, and N cores located evenly spread on a circle around the center, where N can be an even number.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A method, comprising:
receive light from a first single-mode fiber input;
receive light from a second single-mode fiber input;
couple light from the first single mode fiber input and the second single-mode fiber input to a 2-dimensional grating via a waveguide;
generate, via the 2-dimensional grating, multiple modes of light from the coupled light; and
transmit the multiple modes of light to a differential mode delay (DMD) compensated optical fiber configured to support a plurality of modes,
wherein the DMD compensated optical fiber is a multi-mode fiber that includes a plurality of alternating first core portions and second core portions wherein each first core portion has a positive differential mode delay over a range of wavelengths and wherein each second core portion has a negative differential mode delay over the range of wavelengths.

2. A system, comprising:
a differential mode delay (DMD) compensated optical fiber configured to support a plurality of modes that includes a plurality of alternating first core portions and second core portions;

a first single-mode fiber input;
a second single-mode fiber input;
a 2-dimensional grating configured to receive light from the first single mode fiber input and light from the second single-mode fiber input, generate multi-mode light, and couple the generated multi-mode light to the DMD compensated optical fiber; and
one or more waveguides configured to couple the first single mode fiber input and the second single-mode fiber input to the 2-dimensional grating,
wherein each first core portion has a positive differential mode delay over a range of wavelengths, and
wherein each second core portion has a negative differential mode delay over the range of wavelengths.

3. A mode division multiplexing system, comprising:
a multi-core fiber including
  a plurality of differential mode delay (DMD) compensated optical fibers each having a plurality of alternating portions of negative differential mode delay fibers and positive differential mode delay fibers and each configured to guide a plurality of modes of mode division multiplexed light, and
  a cladding surrounding the plurality of DMD compensated optical fibers; and
an integrated circuit including
  a plurality of single-mode fiber inputs,
  a plurality of 2-dimensional gratings each configured to receive light from a different pair of single-mode fiber inputs selected from the plurality of single-mode fiber inputs,
  generate multi-mode light, and
  couple the generated multi-mode light to a differential mode delay (DMD) compensated optical fiber, and
  a plurality of waveguides configured to couple each pair of single mode fiber inputs to an associated 2-dimensional grating,
wherein the plurality of 2-dimensional gratings are each coupled to a first of the plurality of DMD compensated optical fibers, and
wherein the DMD compensated optical fiber, when coupled to the plurality of 2-dimensional gratings, is substantially orthogonal to a plane of the 2-dimensional gratings.

4. The system of claim 3, wherein the integrated circuit further includes a second plurality of 2-dimensional gratings each coupled to a second of the plurality of DMD compensated optical fibers.

5. The system of claim 3, wherein the multi-core fiber further includes a single-mode optical fiber adjacent to the DMD compensated optical fibers inside the cladding.

6. The system of claim 3, wherein each DMD compensated optical fiber is configured to simultaneously guide a plurality of $LP_{01}$ modes.

7. The system of claim 3, wherein each DMD compensated optical fiber is configured to simultaneously guide a plurality of $LP_{11}$ modes.

8. The system of claim 3, wherein each DMD compensated optical fiber is configured to simultaneously guide at least one $LP_{01}$ mode and at least one $LP_{11}$ mode.

9. The system of claim 3, wherein each DMD compensated optical fiber is configured to simultaneously guide two $LP_{01}$ modes and four $LP_{11}$ modes.

10. The system of claim 3, wherein at least one of the single mode fiber inputs receives wave division multiplexed light and wherein the associated DMD compensated optical fiber simultaneously guides light that is both wave division multiplexed and mode division multiplexed.

* * * * *